(12) United States Patent
Haka

(10) Patent No.: US 7,004,881 B2
(45) Date of Patent: Feb. 28, 2006

(54) DUAL INPUT CLUTCH TRANSMISSION HAVING SYNCHRONIZERS FOR ESTABLISHING SPEED RATIOS

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 127 days.

(21) Appl. No.: 10/807,831

(22) Filed: Mar. 24, 2004

(65) Prior Publication Data

US 2005/0215387 A1    Sep. 29, 2005

(51) Int. Cl.
*F16H 3/44*    (2006.01)

(52) U.S. Cl. .................. 475/303; 475/323; 475/275

(58) Field of Classification Search .............. 475/303, 475/323, 325, 275, 280, 269, 276
See application file for complete search history.

(56) References Cited

U.S. PATENT DOCUMENTS

| | | | | |
|---|---|---|---|---|
| 4,223,571 A | * | 9/1980 | Quemerais et al. | 475/276 |
| 6,669,596 B1 | * | 12/2003 | Sefcik | 475/278 |
| 6,764,424 B1 | * | 7/2004 | Usoro et al. | 475/276 |
| 6,764,426 B1 | * | 7/2004 | Usoro et al. | 475/296 |
| 6,767,307 B1 | * | 7/2004 | Lee et al. | 475/276 |
| 6,786,845 B1 | * | 9/2004 | Haka | 475/275 |
| 6,811,010 B1 | * | 11/2004 | Armstrong | 192/48.91 |

* cited by examiner

*Primary Examiner*—Tisha Lewis
*Assistant Examiner*—Justin K. Holmes
(74) *Attorney, Agent, or Firm*—Christopher DeVries

(57) ABSTRACT

A dual input clutch transmission has two planetary gearsets that are selectively connectible between an input shaft and an output shaft through two selectively engageable input clutches. One of the planetary gearsets is controlled by a plurality of synchronizer mechanisms to provide a reverse speed ratio and two forward speed ratios between the input shaft and the output shaft, and the other of the planetary gearsets is controlled by one selectively engageable synchronizer clutch assembly to establish three forward speed ratios between said input shaft and said output shaft.

10 Claims, 1 Drawing Sheet

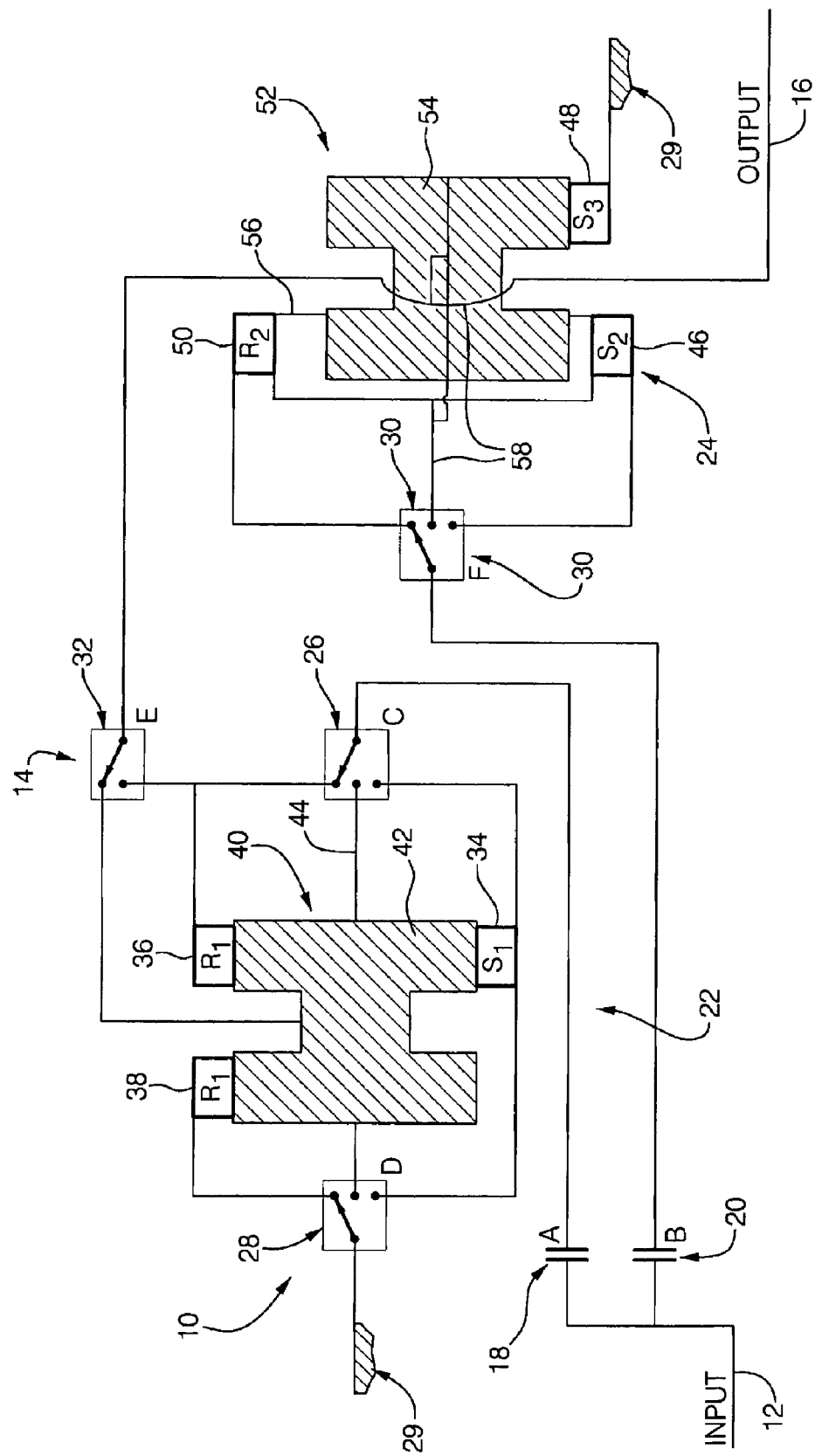

DUAL INPUT CLUTCH TRANSMISSION HAVING SYNCHRONIZERS FOR ESTABLISHING SPEED RATIOS

TECHNICAL FIELD

This invention relates to dual input clutch transmissions having synchronizers for establishing speed ratios within the transmission gear portions.

BACKGROUND OF THE INVENTION

Dual clutch manual transmissions, as they are often called, have two selectively engageable input clutches and a plurality of meshing gear pairs downstream of the input clutches between the input clutches and the transmission output shaft. In most dual clutch arrangements, the gear section includes a central or main shaft aligned with the input shaft and output shaft and two countershafts disposed parallel with the input shaft. Meshing pairs of gears are mounted on the center shaft and on each of the countershafts. The gear pairs are interconnected between the shafts by synchronizers or a mechanical clutch mechanism. The dual input clutch arrangement permits the on-coming speed ratio to be synchronized prior to the power path being moved from one head gearset to another by way of the selectively engageable input clutches. This permits ratio interchanging without torque interruption, which is normally found in single clutch type transmissions.

In a dual clutch transmission which will produce six forward speeds and one reverse speed, the system requires two selectively engageable input clutches, seven and one-half pairs of external gears, one single synchronizer, and three two-way synchronizers. The seven and one-half pairs of gears consists of two head gear set pairs and one pair for each forward ratio, other than direct, and one and a half pair for reverse. In other words, an idler gear must be installed somewhere within the reverse gear train.

SUMMARY OF THE INVENTION

It is an object of the present invention to provide an improved dual clutch manual transmission.

In one aspect of the present invention, the transmission has two selectively engageable input clutches and two planetary gearsets.

In another aspect of the present invention, the transmission incorporates three three-way synchronizers and one two-way synchronizer.

In yet another aspect of the present invention, each of the planetary gearsets is continuously interconnected with the transmission output shaft.

In yet still another aspect of the present invention, one of the planetary gearsets is interconnected with the output shaft through a synchronizer mechanism such that two members of this planetary gearset can be selectively individually connected with the output shaft.

In a yet still another aspect of the present invention, each of the selectively engageable input clutches is connected with a respective one of the planetary gearsets through a three-way synchronizer mechanism, thereby permitting the input shaft to be selectively interconnected with three members of each of the planetary gearsets.

In a further aspect of the present invention, one of the planetary gearsets is connected to a transmission ground member, such as a housing, through another three-way synchronizer mechanism, thereby permitting three members of this planetary gearset to serve as a reaction member for the planetary gearset.

In yet a further aspect of the present invention, the other of the planetary gearsets includes at least one member continuously interconnected with the transmission ground member and one member continuously interconnected with the transmission output shaft.

In a yet still further aspect of the present invention, one of the planetary gearsets provides a reverse ratio, two underdrive ratios, and an overdrive ratio.

In a still further aspect of the present invention, the other of the planetary gearsets provides an underdrive ratio, a direct drive ratio, and an overdrive ratio.

DESCRIPTION OF THE DRAWING

The drawing is a schematic representation of a power transmission incorporating the present invention.

DESCRIPTION OF THE EXEMPLARY EMBODIMENT

Referring to the drawing, there is seen a power transmission generally designated 10 having an input shaft 12, a planetary gear arrangement 14, and an output shaft 16. The planetary gear arrangement 14 includes two selectively engageable input clutches 18 and 20, two planetary gearsets 22 and 24, three three-way mechanical clutches or synchronizer clutches 26, 28, and 30, and one two-way mechanical clutch or synchronizer clutch 32. The selectively engageable input clutches 18 and 20 are conventional fluid-operated friction clutches, commonly used with power transmissions, and the synchronizers 26, 28, 30, and 32 are conventional mechanical synchronizer mechanisms, the construction and operation of which is well known in the art of countershaft transmissions.

The three-way synchronizer clutches can be comprised of a conventional one-way synchronizer and a conventional two-way synchronizer. These synchronizers are combined such that each has a commonly connected element, such as the input hub, and the output rings connected with respective gear elements. For example, the synchronizer clutch 28 can have the input hubs of both a one-way synchronizer and a two-way synchronizer connected with a transmission housing or ground member 29 and the output of the one-way synchronizer connected with a sun gear, and the outputs of the two-way synchronizer connected with a planet carrier and ring gear respectively. By providing selective shifting of the synchronizer rings, a three-way synchronizer is provided. The synchronizers 26, 28, 30 and 32 are shown schematically. The synchronizers 26, 28, and 30 are shown with a common member and three output members. This combination of structures, a one-way synchronizer and a two way synchronizer are considered to be conventional devices, since those skilled in the art will recognize the structural possibilities without further description. An alternative to employing the combination of a conventional one-way synchronizer and a conventional two-way synchronizer is to utilize the multiple connection synchronizer described in U.S. Ser. No. 10/717,320 filed Nov. 19, 2003 and assigned to the assignee of this application. This patent application describes a plurality of multiple connection synchronizers that will provide the shifting capability used with the present invention.

The planetary gearset 22 includes a sun gear member 34, a first ring gear member 36, a second ring gear member 38, and planet carrier assembly member 40. The planet carrier assembly member 40 includes a plurality of pinion members 42 rotatably mounted on a planet carrier member 44 and disposed in meshing relationship between the sun gear member 34 and both of the ring gear members 36 and 38. By providing two ring gear members 36, 38, the planet carrier member 44 can be connected with three of the synchronizers 26, 28, 32 as described later.

The planetary gearset 24 includes a first sun gear member 46, a second sun gear member 48, a ring gear member 50, and a planet carrier assembly member 52. The planet carrier assembly member 52 includes a plurality of long pinion gear members 54 meshing with the sun gear member 48 and a plurality of short pinion gear members 56 each meshing with the sun gear member 46, the ring gear member 50, and respective ones of the long pinion gear members 54. The pinion gear members 54 and 56 are rotatably mounted on a planet carrier member 58, which is continuously interconnected with the output shaft 16.

The selectively engageable input clutch 18 is continuously connected with the synchronizer clutch 26. The selectively engageable input clutch 20 is continuously connected with the synchronizer clutch 30. Thus, when the clutch 18 is engaged, the synchronizer clutch 26 rotates with the input shaft 12, and when the clutch 20 is engaged, the synchronizer clutch 30 rotates with the input shaft 12.

The synchronizer clutch 26 is a three-way synchronizer, which permits selective engagement with the sun gear member 34, the planet carrier member 44, and the ring gear member 36. Thus, each of these planetary members can be selectively interconnected with the input shaft 12 through the synchronizer clutch 26 and the selectively engageable input clutch 18.

The synchronizer clutch 30 is a three-way synchronizer clutch, which permits selective connection with the sun gear member 46, the ring gear member 50, and the planet carrier member 58, individually. Therefore, each of these planetary members, sun gear member 46, planet carrier member 58, and ring gear member 50 can be selectively connected with the input shaft 12 through the synchronizer clutch 30 and the input clutch 20.

The synchronizer clutch 28 has one portion thereof continuously connected with the transmission housing or transmission ground member 29. The synchronizer clutch 28 is a three-way synchronizer assembly, which permits interconnection with the sun gear member 34, the planet carrier member 44, and the ring gear member 38. Thus, each of these planetary members can be selectively interconnected with a transmission ground member or housing and held stationary.

The synchronizer clutch 32 has one portion thereof continuously interconnected with the output shaft 16 and is a conventional two-way synchronizer permitting selective interconnection with the planet carrier member 44 and the ring gear member 36. Therefore, each of these planetary members can be selectively interconnected with the transmission output shaft 16.

The selective engagement of the input clutches 18 and 20 and the synchronizer clutches 26, 28, 30, and 32 will permit the establishment of six forward speed ratios and one reverse speed ratio between the input shaft 12 and the output shaft 16.

The reverse speed ratio is established by selectively connecting the synchronizer clutch 26 with the sun gear member 34, the synchronizer clutch 28 with the planet carrier member 44, and the synchronizer clutch 32 with the ring gear member 36. Thus, the ring gear member 36 is connected with the output shaft 16. By engaging the input clutch 18, the sun gear member 34 will be driven by the input shaft 12 and the ring gear member 36 will be rotated in a direction opposite to the input shaft 12, and therefore the transmission will operate in a reverse speed ratio.

The first forward speed ratio is established with the manipulation of the synchronizer clutch 26 to engage the sun gear member 34, the synchronizer clutch 28 to engage the ring gear member 38, and the synchronizer clutch 32 to engage the planet carrier member 44. By engaging the input clutch 18, the sun gear member 26 is rotated in the same direction as the input shaft 12 and the planet carrier member 44 is rotated in the same direction as the input shaft 12 at a reduced speed ratio. Therefore, the output shaft 16, which is connected with the planet carrier member 44 in this condition, will rotate forwardly at a reduced speed ratio.

A neutral condition between reverse and first forward ratio is established by disengaging both input clutches 18 and 20.

The second forward speed ratio can be preselected while the first forward speed ratio is operating. The second forward speed ratio is preselected by manipulating the synchronizer clutch 30 to engage the sun gear member 46. Then by swapping or interchanging the clutches 18 and 20, the input shaft 12 will be drivingly connected with the sun gear member 46 and the synchronizer clutch 26 will be disconnected from the input shaft 12. The sun gear member 46 will cause forward rotation of the planet carrier member 58 and therefore output shaft 16 at a speed reduced from the speed of the input shaft 12. Therefore, the second forward speed ratio is an underdrive ratio.

The third forward speed ratio can be preselected by manipulating the synchronizer clutch 26 to engage the ring gear member 36, the synchronizer clutch 28 to engage the sun gear member 34, and the synchronizer clutch 32 to engage the planet carrier member 44. These interchanges are accomplished while the clutch 18 is disengaged and the clutch 20 is engaged. To enforce or complete ratio change from second-to-third ratio, the clutches 18 and 20 are again swapped, such that the synchronizer clutch 30 is disengaged from the input shaft 12, while the synchronizer clutch 26 is engaged with the input shaft 12. This interchange can, of course, occur without a torque interruption at the output shaft 16. During the third forward speed ratio, the ring gear member 26 is rotated by the input shaft 12, the sun gear member 34 is held stationary through the synchronizer clutch 28, and the planet carrier member 44 is rotated in the same direction as the input shaft 12 at a reduced speed ratio. The planet carrier member 44 is connected with the output shaft 16 through the synchronizer clutch 32, therefore a reduced speed ratio is accomplished between the input shaft 12 and the output shaft 16.

The fourth forward speed ratio is preselected during the third speed ratio by connecting the synchronizer clutch 30 with the planet carrier member 58, which is directly connected with the output shaft 16. An interchange from the third ratio to the fourth ratio is then accomplished by disengaging the clutch 18 while simultaneously engaging the clutch 20 permitting an upshift to fourth ratio without a torque interruption at the output shaft 16. The fourth forward speed ratio is a direct drive in that the input shaft 12 is connected directly to the output shaft 16 through the clutch 20, the synchronizer clutch 30, and the planet carrier member 58.

The fifth forward speed ratio is preselected by manipulating the synchronizer clutch 26 to engage the planet carrier member 44, the synchronizer clutch 28 is manipulated to engage the sun gear member 34, and the synchronizer clutch 32 is manipulated to engage the ring gear member 36. Under this condition, the planet carrier member 44 is connected with the input clutch 18, the sun gear member 34 is connected to the transmission ground member, and the ring gear member 36 is connected with the output shaft 16. To complete the fifth forward speed ratio engagement, the clutch 18 is engaged while the clutch 20 is disengaged. With the clutch 18 engaged in this condition, the planet carrier member 44 is rotated at the speed of the input shaft 12, and the ring gear member 36 and therefore the output shaft 16 are rotated at an increased speed or overdrive ratio compared with the input shaft 12. The fifth forward speed ratio is therefore an overdrive ratio.

The sixth forward speed ratio is preselected by manipulating the synchronizer clutch 30 to engage between the clutch 20 and the ring gear member 50. Then by interchanging the input clutches 20 and 18, the sixth forward speed ratio is completed such that the ring gear member 50 is rotated in unison with the input shaft 12, and the output shaft 16 is rotated at an increased speed ratio through the planet carrier member 58. The sixth forward speed ratio is an overdrive speed ratio.

Upon reviewing the description of the speed ratios, those skilled in the art will recognize that the reverse speed ratio, the first forward speed ratio, the third forward speed ratio, and the fifth forward speed ratio are all established through the planetary gearset 22. The second forward speed ratio, the fourth forward speed ratio, and the sixth forward speed ratio are all established through the planetary gearset 24. The planetary gearset 24 is described above as having a short pinion member 56 engaged between the sun gear member 46 and the ring gear member 50. The pinion gear 56 also engaged with the long pinion gear 54.

Alternatives are available with this meshing relationship. A short pinion meshing between the sun gear member 34 and the long pinion member 54, and another short pinion meshing between the ring gear member 50 and the long pinion member 54 can also be employed. There are other alternative embodiments that those skilled in the art will recognize as viable. What should be noted is that an odd number of pinion meshes occur between the sun gear member 46 and the ring gear member 50, while an even number of pinion meshes occurs between the sun gear member 48 and the ring gear member 50.

If ring gears 36 and 38 both have 78 teeth, the sun gear 34 has 30 teeth, the ring gear 50 has 77 teeth, sun gear 46 has 28 teeth, and the sun gear 48 has 32 teeth, the following ratios will be attained:

| First gear | 3.60 |
| Second gear | 2.143 |
| Third gear | 1.385 |
| Fourth gear | 1.00 |
| Fifth gear | 0.722 |
| Sixth gear | 0.584 |
| Reverse | −2.60 |

The step ratio between successive forward ratios decreases as the ratios progress from first to sixth.

Obviously, many modifications and variations are possible in light of the above disclosure. Therefore, it should be understood that the invention is only to be limited by the scope of the appended claims.

What is claimed is:

1. A dual input clutch transmission comprising:
an input shaft;
an output shaft;
a stationary ground member;
a first selectively engageable input clutch;
a second selectively engageable input clutch;
a first planetary gearset having three rotatable members;
a second planetary gearset having three rotatable members and one continuously stationary member, one of said three rotatable members being continuously interconnected with said output shaft;
a first synchronizer clutch means for operatively selectively interconnecting said first selectively engageable input clutch with each of said rotatable members of said first planetary gearset individually;
a second synchronizer clutch means for operatively selectively interconnecting said second selectively engageable input clutch with each of said rotatable members of second planetary gearset individually;
a third synchronizer clutch means for operatively selectively interconnecting said ground member with each of said rotatable members of said first planetary gearset individually;
a fourth synchronizer clutch means for operatively selectively interconnecting two of said rotatable members of said first planetary gearset with said output shaft; and
said first selectively engageable input clutch and said first, third, and fourth of said synchronizer clutch means being engaged in combinations to establish three forward speed ratios and one reverse speed ratio between said input shaft and said output shaft, and said second selectively engageable input clutch and said second synchronizer clutch means being engaged to establish three forward speed ratios between said input shaft and said output shaft.

2. The dual input clutch transmission defined in claim 1 further comprising:
said first synchronizer clutch means being a three-way clutch to independently interconnect said first selectively engageable input clutch with each rotatable member of said first planetary gearset.

3. The dual input clutch transmission defined in claim 1 further comprising:
said second synchronizer clutch means comprising a three-way mechanical clutch that independently interconnects said first selectively engageable input clutch with each rotatable member of said second planetary gearset.

4. The dual input clutch transmission defined in claim 1 further comprising:
said third synchronizer clutch means comprising a three-way mechanical clutch that independently interconnects said first selectively engageable input clutch with each rotatable member of said first planetary gearset.

5. A dual input clutch transmission comprising:
an input shaft;
an output shaft;
a stationary housing member;
a first input clutch means;
a second input clutch means;
a first planetary gearset having a sun gear member, a ring gear member means, a planet carrier member, and a plurality of pinion gear members rotatably mounted on said planet carrier member disposed in meshing relation with both said sun gear member and said ring gear member means;

a second planetary gearset having a first sun gear member, a second sun gear member, a ring gear member, a planet carrier member, a plurality of first pinion gear members rotatably mounted on said planet carrier member and meshing with said second sun gear member, a plurality of second pinion gear members rotatably mounted on said planet carrier member intermeshing with respective ones of said first pinion gear members and also meshing with both said sun gear member and said ring gear member, said second sun gear member being continuously interconnected with said stationary housing member, and said planet carrier member being continuously interconnected with said output shaft;

a first synchronizer clutch means for selectively individually interconnecting said first input clutch means with said sun gear member, said ring gear member, and said planet carrier member of said first planetary gearset;

a second synchronizer clutch means for selectively individually interconnecting said second input clutch means with said first sun gear member, said ring gear member, and said planet carrier member of said second planetary gearset;

a third synchronizer clutch means for selectively individually interconnecting said stationary housing member with said sun gear member, said ring gear member, and said planet carrier member of said first planetary gearset;

a fourth synchronizer clutch means for selectively individually interconnecting said ring gear member means and said planet carrier member of said first planetary gearset with said output shaft.

6. The dual input clutch transmission defined in claim 5 further comprising:

during a reverse speed ratio, said input shaft being interconnected with said output shaft through said first input clutch means, first synchronizer clutch means said sun gear member of said first planetary gearset, said ring gear member means, and said fourth synchronizer clutch means, and said planet carrier member of said first planetary gearset being connected with said stationary housing member;

during a first forward speed ratio, said input shaft being connected with said output shaft through said first input clutch means, said first synchronizer clutch means, said sun gear member of said first planetary gearset, said planet carrier member of said first planetary gearset and said fourth synchronizer clutch means, said ring gear member means being connected with said stationary housing member through said third synchronizer clutch means;

during a second forward speed ratio, said input shaft being connected with said output shaft through said second input clutch means, said second synchronizer clutch means, said first sun gear member and said planet carrier member of said second planetary gearset;

during a third forward speed ratio, said input shaft being connected with said output shaft through said first input clutch means, said first synchronizer clutch means, said ring gear member means, said planet carrier member of said first planetary gearset, said fourth synchronizer clutch means, and said sun gear member being connected with said stationary housing member through said third synchronizer clutch means;

during a fourth forward speed ratio, said input shaft being connected with said output shaft through said second input clutch means, said second synchronizer clutch means and said planet carrier member of said second planetary gearset;

during a fifth forward speed ratio, said input shaft being connected with said output shaft through said first input clutch means, said first synchronizer clutch means, said planet carrier member of said first planetary gearset, said ring gear member means, said fourth synchronizer clutch means, and said sun gear member being connected with said stationary housing member through said third synchronizer clutch means; and during a sixth forward speed ratio, said input shaft being connected with said output shaft through said second input clutch means, said second synchronizer clutch means, said ring gear member of said second planetary gearset, and said planet carrier member of said second planetary gearset.

7. The dual input clutch transmission defined in claim 5 further comprising:

said first input clutch means being engaged in concert with a plurality of combinations of engagements of said first synchronizer clutch means, said third synchronizer clutch means, and said fourth synchronizer clutch means to establish three forward speed ratios and one reverse speed ratio between said input shaft and said output shaft through said first planetary gearset.

8. The dual input clutch transmission defined in claim 5 further comprising:

said second input clutch means being engaged in concert with a plurality of combinations of engagements of said second synchronizer clutch means to establish three forward speed ratios between said input shaft and said output shaft through said second planetary gearset.

9. The dual input clutch transmission defined in claim 5 further comprising:

said first input clutch means being engaged in concert with a plurality of combinations of engagements of said first synchronizer clutch means, said third synchronizer clutch means, and said fourth synchronizer clutch means to establish a first, a third, and a fifth forward speed ratio and one reverse speed ratio between said input shaft and said output shaft through said first planetary gearset;

said second input clutch means being engaged in concert with a plurality of combinations of engagements of said second synchronizer clutch means to establish a second, a fourth, and a sixth forward speed ratio between said input shaft and said output shaft through said second planetary gearset;

said second forward speed ratio having a numerical value intermediate numerical values of said first and third forward speed ratios and said second synchronizer clutch means being positionable to said second forward speed ratio when either said first or third forward speed ratio is operable;

said fourth forward speed ratio having a numerical value intermediate numerical values of said third and fifth forward speed ratios and said second synchronizer clutch means being positionable to said fourth forward speed ratio when either said third or fifth forward speed ratio is operable; and said sixth forward speed ratio having a numerical value greater than the numerical value of said fifth forward speed ratios and said second synchronizer clutch means being positionable to said sixth forward speed ratio when said fifth forward speed ratio is operable.

10. The dual input clutch transmission defined in claim 9 further comprising:

said first, third and fourth synchronizer clutch means being pre-selectable to said first forward speed ratio when said second forward speed ratio is operable;

said first, third and fourth synchronizer clutch means being pre-selectable to said third forward speed ratio when either said second or fourth forward speed ratios are operable; and said first, third and fourth synchronizer clutch means being pre-selectable to said fifth forward speed ratio when either said fourth or sixth speed ratio is operable.

* * * * *